(12) United States Patent
Xiao

(10) Patent No.: US 11,770,264 B2
(45) Date of Patent: Sep. 26, 2023

(54) METHOD AND APPARATUS FOR PROCESSING RESOURCE OF BLOCK CHAIN, DEVICE AND MEDIUM

(71) Applicant: Baidu Online Network Technology (Beijing) Co., Ltd., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 390 days.

(21) Appl. No.: 17/020,392

(22) Filed: Sep. 14, 2020

(65) Prior Publication Data

US 2021/0264417 A1    Aug. 26, 2021

(30) Foreign Application Priority Data

Feb. 21, 2020   (CN) .......................... 202010108737.0

(51) Int. Cl.
*H04L 9/32*    (2006.01)
*G06Q 10/10*   (2023.01)
(Continued)

(52) U.S. Cl.
CPC ........... *H04L 9/3268* (2013.01); *G06Q 10/10* (2013.01); *G06Q 20/0655* (2013.01);
(Continued)

(58) Field of Classification Search
CPC ............ G06Q 20/38215; G06Q 10/10; G06Q 20/0655; G06Q 30/0185; G06Q 2230/00;
(Continued)

(56) References Cited

U.S. PATENT DOCUMENTS 9,646,029 B1 *   5/2017  Baird, III ............ G06F 16/2379
11,151,549 B2 * 10/2021 Ehrlich-Quinn ..... G06Q 20/326
(Continued)

FOREIGN PATENT DOCUMENTS

AU   2022204540 A1 *  7/2022  ............ G06Q 20/02
CN   107038638 A      8/2017
(Continued)

OTHER PUBLICATIONS

Japanese Office Action dated Feb. 22, 2022 for Japanese Patent Application No. 2020-159726.
(Continued)

*Primary Examiner* — Neha Patel
*Assistant Examiner* — Jahed Ali
(74) *Attorney, Agent, or Firm* — Knobbe, Martens, Olson & Bear LLP

(57) ABSTRACT

A method for processing a resource of a block chain may include: issuing a stake certificate in a block chain based on a set stake certificate issuing mechanism, allocating the stake certificate to a stake account according to a stake proportion, and storing operation data of the issuing and allocating the stake certificate into the block chain, the stake account referring to a block chain account; issuing a circulation resource in the block chain based on a set circulation resource issuing mechanism, allocating the circulation resource to the block chain account according to a circulation resource allocation strategy, and storing the operations of the issuing and allocating the circulation resource into the block chain; and ascertaining, during operation of the block chain, a block-producing node according to a delegated proof of stake consensus algorithm, by using the stake certificate of each stake account as a consensus certificate.

15 Claims, 3 Drawing Sheets

(51) Int. Cl.
*G06Q 20/06* (2012.01)
*G06Q 20/38* (2012.01)
*G06Q 30/018* (2023.01)
*H04L 9/06* (2006.01)
*H04L 9/00* (2022.01)

(52) U.S. Cl.
CPC ... *G06Q 20/38215* (2013.01); *G06Q 30/0185* (2013.01); *H04L 9/0637* (2013.01); *G06Q 2230/00* (2013.01); *H04L 9/50* (2022.05)

(58) Field of Classification Search
CPC .... G06Q 40/04; G06Q 2220/00; G06Q 20/02; G06Q 20/065; G06Q 20/382; G06Q 20/10; H04L 9/0637; H04L 9/3268; H04L 9/50; H04L 9/3239; H04L 2209/56; H04L 67/1074; H04L 67/1097; G06F 16/23; G06F 16/27

See application file for complete search history.

(56) References Cited

U.S. PATENT DOCUMENTS

| | | | |
|---|---|---|---|
| 2020/0013027 A1* | 1/2020 | Zhu | H04L 9/50 |
| 2020/0034352 A1 | 1/2020 | Li et al. | |
| 2020/0143368 A1* | 5/2020 | Zhang | G06Q 20/065 |
| 2020/0186510 A1* | 6/2020 | Kursun | H04L 63/1466 |
| 2021/0209885 A1* | 7/2021 | Lundin | G07C 13/00 |
| 2021/0398091 A1* | 12/2021 | Yan | G06Q 20/065 |
| 2021/0398104 A1* | 12/2021 | Yan | G06Q 20/4037 |
| 2022/0156757 A1* | 5/2022 | Loyd | G06K 7/1417 |
| 2022/0158842 A1* | 5/2022 | Camenisch | H04L 9/3257 |

FOREIGN PATENT DOCUMENTS

| | | | |
|---|---|---|---|
| CN | 107578336 A | | 1/2018 |
| CN | 109670953 A | | 4/2019 |
| CN | 109885264 A | | 6/2019 |
| CN | 110648236 A | | 1/2020 |
| CN | 116032465 A | * | 4/2023 |
| JP | 2009-181553 A | | 8/2009 |
| JP | 2009181553 A | | 8/2009 |
| JP | 2019-103112 | | 6/2019 |
| KR | 101701131 B1 | | 2/2017 |
| KR | 20190125426 A | | 11/2019 |
| WO | WO 2018-158936 | | 9/2018 |
| WO | WO 2019-038839 | | 2/2019 |

OTHER PUBLICATIONS

Ferdous, et al., "Blockchain Consensuses Algorithms: A Survey", arxiv.org, Cornell University Library, 201 Onlin Library Cornell University Ithaca, NY 14853, Jan. 20, 2020.

Deuber, et al., "Minting Mechanisms for Blockchain—or—Moving from Cryptoassets to Cryptocurrencies", IACR, International Association for Cryptologic Research, [Online] vol. 20181116:182027, Nov. 15, 2018 (Nov. 15, 2018), pp. 1-37, XP061026956, Retrieved from the Internet: URL:http://eprint.iacr.org/2018/1110.pdf> [retrieved on Nov. 15, 2018].

Debus, "FSBC Working Paper Consensus Methods in Blockchain Systems", May 31, 2017 (May 31, 2017), XP055513738, Retrieved from the Internet: URL: http://explore-ip.com/2017_Consensus-Methods-in-Blockchain-Systems. Pdf [retrieved on Oct. 9, 2018].

European Search Report dated Jun. 25, 2021 for European Patent Application No. 21157261.5. 11 pages.

Jun. 10, 2022 Korean Office Action for Korean application No. 10-2021-0020587 (6 pgs).

Hyun-young, Signal: Tezos has finished its first protocol upgrade (Jun. 8, 2022) https://signal.sedaily.com/New/News/NewsPrint?Nid=1VJCC0224O.

Naver Blog: About BlockChain, Proof of Work (Oct. 27, 2019) https://blog.naver.com/inhae7757/221690138102.

* cited by examiner

METHOD AND APPARATUS FOR PROCESSING RESOURCE OF BLOCK CHAIN, DEVICE AND MEDIUM

CROSS-REFERENCE TO RELATED APPLICATIONS

This application claims priority to Chinese Application No. 202010108737.0, filed on Feb. 21, 2020 and entitled "Method and Apparatus for Processing Resource of Block Chain, Device and Medium," the entire disclosure of which is hereby incorporated by reference.

TECHNICAL FIELD

Embodiments of the present disclosure relate to the field of computer technology, and specifically to the block chain technology.

BACKGROUND

A block chain system needs to ascertain a block-producing node in a current block production cycle through a consensus mechanism. There are many types of consensus mechanisms, among which the delegated proof of stake (DPOS) is a widely applied consensus mechanism. The principle of the DPOS consensus mechanism is roughly that, for a set number of candidate accounts, the rights thereof are ascertained according to the number of digital currencies held by the candidate accounts, where the rights may be referred to as stakes. Then, the block-producing node is ascertained from the candidate accounts according to the stakes and a set DPOS algorithm. For example, for all blocks of one day, the candidate accounts control the nodes of the blocks as the block-producing node in turn according to a stake proportion.

However, the digital currency, as a resource in a block chain, also has circulation attributes. There is a contradiction between the existing DPOS consensus mechanism and the existing circulation mechanism of the digital currency in the block chain, such that the consensus result of the DPOS consensus mechanism is unstable and uncontrollable.

SUMMARY

Embodiments of the present disclosure provide a method and apparatus for processing a resource of a block chain, a device and a medium, to take account of stake resource characteristics and circulation resource characteristics required by a block chain consensus.

In a first aspect, an embodiment of the present disclosure provides a method for processing a resource of a block chain, the method including: issuing a stake certificate in a block chain based on a set stake certificate issuing mechanism, allocating the stake certificate to a stake account according to a stake proportion, and storing operation data of the issuing and allocating the stake certificate into the block chain, the stake account referring to a block chain account; issuing a circulation resource in the block chain based on a set circulation resource issuing mechanism, allocating the circulation resource to the block chain account according to a circulation resource allocation strategy, and storing operations of the issuing and allocating the circulation resource into the block chain; and ascertaining, during operation of the block chain, a block-producing node according to a delegated proof of stake consensus algorithm, by using the stake certificate of each stake account as a consensus certificate.

An embodiment of the present disclosure has the following advantages or beneficial effects: two sets of independent issuing mechanisms (the stake certificate issuing mechanism and the circulation resource issuing mechanism) are set in the block chain, the block-producing node is ascertained based on the stake certificate, and the circulation resource is used as the resource consumption in the block chain, thereby solving the contradiction between the existing DPOS consensus mechanism and the circulation mechanism of the digital currency. Thus, the stake resource characteristics and the circulation resource characteristics required by the block chain consensus may be taken into account, which makes the consensus result of the DPOS consensus mechanism stable and controllable.

Alternatively, the issuing a stake certificate in a block chain based on a set stake certificate issuing mechanism, allocating the stake certificate to a stake account according to a stake proportion, and storing operation data of the issuing and allocating the stake certificate into the block chain includes: ascertaining, when a creation for the block chain is initiated, a total number of initially issued stake certificates, and allocating the stake certificates according to the stake proportion of each stake account; and storing the total number of the stake certificates and the stake certificate allocated to the each stake account to a genesis block of the block chain.

An embodiment of the present disclosure has the following advantages or beneficial effects: after the stake certificate is initially issued, the allocation information of the stake certificate is stored into the block chain, which is beneficial for subsequent tracing.

Alternatively, the issuing a stake certificate in a block chain based on a set stake certificate issuing mechanism, allocating the stake certificate to a stake account according to a stake proportion, and storing operation data of the issuing and allocating the stake certificate into the block chain includes: acquiring a stake certificate update vote transaction request initiated by a stake account; performing the stake certificate update vote transaction request to request other stake accounts to vote on an update operation for a stake certificate; and performing the update operation on the stake certificate according to a voting result, and storing transaction data of the stake certificate update vote transaction request into the block chain, where the update operation includes an operation of additionally issuing a stake certificate, an operation pf transferring a stake certificate to a new stake account, or an operation of deleting a stake certificate.

An embodiment of the present disclosure has the following advantages or beneficial effects: the allocation proportion of the stake certificate may be updated in different ways based on the voting of the stake accounts, such that the stake certificate may be flexibly adjusted on the basis of maintaining quantitative stability.

Alternatively, the issuing a circulation resource in the block chain based on a set circulation resource issuing mechanism, allocating the circulation resource to the block chain account according to a circulation resource allocation strategy, and storing operations of the issuing and allocating the circulation resource into the block chain includes: acquiring a circulation resource update vote transaction request initiated by a stake account; performing the circulation resource update vote transaction request to request other stake accounts to vote on an update operation for a circulation resource; and performing the update operation on the circulation resource according to a voting result, and storing transaction data of the circulation resource update vote transaction request into the block chain, where the update operation includes additional issuance and an allocation strategy of the circulation resource.

Alternatively, the allocation strategy is to allocate additionally issued circulation resources to stake accounts evenly or according to stake proportions.

An embodiment of the present disclosure has the following advantages or beneficial effects: since the stake accounts can vote for the update of the circulation resource according to actual situations, the circulation resource can be additionally issued, thereby avoiding the inflation caused by the additional issuance of digital currencies in the existing technology.

Alternatively, the issuing a circulation resource in the block chain based on a set circulation resource issuing mechanism, allocating the circulation resource to the block chain account according to a circulation resource allocation strategy, and storing operations of the issuing and allocating the circulation resource into the block chain includes: initiating, based on a smart contract deployed in the block chain, a circulation resource additional issuance transaction request when a set additional issuance condition is satisfied; and performing the circulation resource additional issuance transaction request, allocating an additionally issued circulation resource to the block chain account according to an allocation strategy in the circulation resource additional issuance transaction request, and storing transaction data of the circulation resource additional issuance transaction request into the block chain.

Alternatively, the set additional issuance condition includes: a total number of block chain accounts reaching a set number, a block height reaching a set threshold value, or a circulation rate of the circulation resource meeting a set condition.

An embodiment of the present disclosure has the following advantages or beneficial effects: through a pre-deployed smart contract in the block chain, the additional issuance of the circulation resources may be implemented when the additional issuance condition is satisfied, thereby avoiding the inflation caused by the additional issuance of digital currencies in the existing technology.

Alternatively, before the issuing a stake certificate in a block chain based on a set stake certificate issuing mechanism, the method further includes: changing the consensus certificate of the delegated proof of stake consensus algorithm deployed in the block chain from the circulation resource to the stake certificate.

An embodiment of the present disclosure has the following advantages or beneficial effects: by modifying the consensus certificate of the deployed delegated proof of stake consensus algorithm in the block chain system, the stake certificate may be used as the consensus certificate to ascertain the block-producing node, which is also applicable to the existing block chain system, thus improving the application range.

In a second aspect, an embodiment of the present disclosure provides an apparatus for processing a resource of a block chain, the apparatus including: a stake certificate issuing module, configured to issue a stake certificate in a block chain based on a set stake certificate issuing mechanism, allocate the stake certificate to a stake account according to a stake proportion, and store operation data of the issuing and allocating the stake certificate into the block chain, the stake account referring to a block chain account; a circulation resource issuing module, configured to issue a circulation resource in the block chain based on a set circulation resource issuing mechanism, allocate the circulation resource to the block chain account according to a circulation resource allocation strategy, and store operations of the issuing and allocating the circulation resource into the block chain; and a block-producing node ascertaining module, configured to ascertain, during operation of the block chain, a block-producing node according to a delegated proof of stake consensus algorithm, by using the stake certificate of each stake account as a consensus certificate.

In a third aspect, an embodiment of the present disclosure provides an electronic device, the electronic device including: at least one processor; and a storage device, communicatively connected with the at least one processor, where the storage device stores an instruction executable by the at least one processor, and the instruction is executed by the at least one processor, to cause the at least one processor to perform the method for processing a resource of a block chain according to embodiments of the present disclosure.

In a fourth aspect, an embodiment of the present disclosure provides a non-transitory computer readable storage medium, storing a computer instruction, where the computer instruction is used to cause a computer to perform the method for processing a resource of a block chain according to embodiments of the present disclosure.

An embodiment of the present disclosure has the following advantages or beneficial effects: the stake certificate is issued in the block chain based on the set stake certificate issuing mechanism, and allocated to the stake account according to the stake proportion, and the operation data of the issuing and allocating the stake certificate is stored into the block chain, the stake account referring to the block chain account. The circulation resources is issued in the block chain based on the set circulation resource issuing mechanism, and allocated to the block chain account according to the circulation resource allocation strategy, and operations of the issuing and allocating the circulation resources are stored into the block chain. Then, during the operation of the block chain, by using the stake certificate of the each stake account as the consensus certificate, the block-producing node is ascertained according to the delegated proof of stake consensus algorithm. In an embodiment of the present disclosure, two sets of independent issuing mechanisms (the stake certificate issuing mechanism and the circulation resource issuing mechanism) are set in the block chain, the block-producing node is ascertained based on the stake certificates, and the circulation resource is used as the resource consumption in the block chain, thereby solving the contradiction between the existing DPOS consensus mechanism and the circulation mechanism of the digital currency. Thus, the stake resource characteristics and the circulation resource characteristics required by the block chain consensus may be taken into account, which makes the consensus result of the DPOS consensus mechanism stable and controllable.

Other effects of the above alternative implementations will be described hereinafter in combination with specific embodiments.

BRIEF DESCRIPTION OF THE DRAWINGS

Accompanying drawings are used for a better understanding of the scheme, and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

Figure 1:
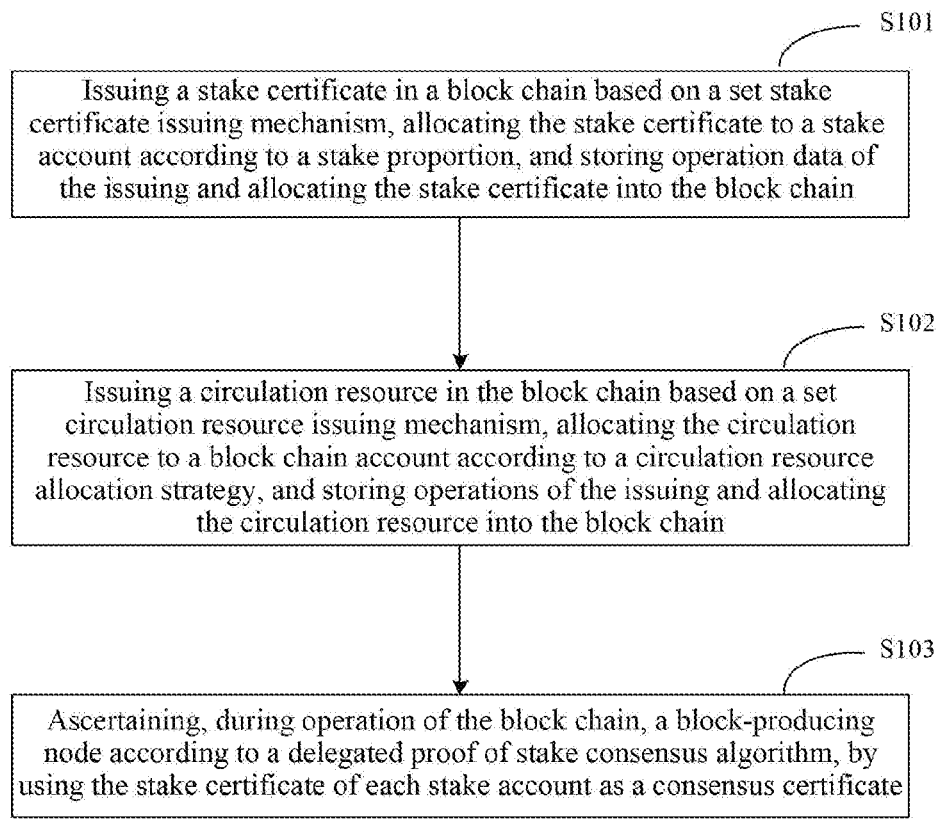
FIG. 1 is a flowchart of a method for processing a resource of a block chain according to an embodiment of the present disclosure.

FIG. 1 is a flowchart of a method for processing a resource of a block chain according to an embodiment of the present disclosure. This embodiment may be applicable to a situation where processing for a resource is implemented in a block chain. The method may be performed by an apparatus for processing a resource of a block chain. The apparatus is implemented by means of software and/or hardware, and may be configured in an electronic device. As shown in FIG. 1, the method specifically includes the following steps.

S101, issuing a stake certificate in a block chain based on a set stake certificate issuing mechanism, allocating the stake certificate to a stake account according to a stake proportion, and storing operation data of the issuing and allocating the stake certificate into the block chain.

In the specific embodiment of the present disclosure, a stake certificate may be a resource certificate newly added in a block chain system, and the total number of stake certificates in the block chain is constant. The function of the stake certificate is different from that of the existing digital currency. The stake certificate is not used for resource circulation, and the specific form of the stake certificate is not limited in this embodiment. For example, the stake certificate may be a new type of digital currency, where the new type of digital currency may be based on the settlement system of the ERC2.0 standard or other digital currency agreements. The stake certificate issuing mechanism is a mechanism preset in the block chain system and used for issuing the stake certificate.

In this embodiment, the stake account is the block chain account, and is generally a management account of an actual manager of a block chain service, for example, a management account of a block chain node. The stake account may be ascertained at the time of creating the block chain, and the specific determination approach is not limited in this embodiment. For example, the stake account may be ascertained by an offline agreement.

Specifically, when the creation for the block chain is initiated, the total number of initially issued stake certificates is ascertained, the stake certificates are allocated according to a stake proportion of each stake account, and the total number of the stake certificates and a stake certificate allocated to the each stake account are stored to the genesis block of the block chain. Here, the stake proportion of the stake account refers to a proportion of the number of the stake certificates held in the stake account to the total number of the stake certificates. The total number of the initially issued stake certificates and the stake proportion of the each stake account may also be set according to actual situations, of which the specific determination approach is not limited in this embodiment. For example, the total number of the stake certificates and the stake proportion of the each stake account may be ascertained by an off-line agreement.

The genesis block refers to the 0th block in the block chain. After the stake certificates are initially issued, the genesis block stores the total number of the stake certificates and the number of the stake certificates of the each stake account, which is beneficial for subsequent tracing.

S102, issuing a circulation resource in the block chain based on a set circulation resource issuing mechanism, allocating the circulation resource to a block chain account according to a circulation resource allocation strategy, and storing operations of the issuing and allocating the circulation resource into the block chain.

In this embodiment, a circulation resource may be a digital currency existing in the block chain system, and the total number of circulation resources in the block chain is increasable. However, the circulation resource is different from the existing digital currency in function, and is only used for the circulation of resources, for example, transactions, transfer distributions, and handling fees. The circulation resource issuing mechanism is a mechanism for issuing the above circulation resource in the block chain system. The circulation resource allocation strategy is a strategy used for allocating the circulation resource and is ascertained by the stake account in the block chain.

Specifically, at the time of creating the block chain, a preset number of circulation resources may be allocated to stock accounts for holding, and may flow to a non-stake account in the block chain accounts in various ways during the operation of the block chain. The specific circulation approach is not limited in this embodiment. For example, a circulation resource may be obtained by registering a block chain account. Here, the set number of the circulation resources and the allocation proportions allocated to the stake accounts are not limited in this embodiment, and may be ascertained through the voting of the stake accounts. For example, the circulation resources generated when the block chain is created may be allocated according to the stake proportions of the stake accounts, or may be evenly allocated to the stake accounts.

Alternatively, when creating the block chain, the preset number of circulation resources may be directly allocated to all block chain accounts according to a set rule, for example, may be evenly allocated to all the block chain accounts.

S103, ascertaining, during operation of the block chain, a block-producing node according to a delegated proof of stake consensus algorithm, by using the stake certificate of each stake account as a consensus certificate.

In the specific embodiment of the present disclosure, the consensus certificate refers to a certificate, in the delegated proof of stake consensus algorithm, used for ascertaining stakes for the preset number of candidate accounts. Unlike the existing technology in which the stakes are ascertained using the numbers of digital currencies held by the candidate accounts, in this embodiment, the stakes of the stake accounts are ascertained using the newly added stake certificates.

Specifically, during the operation of the block chain, the stakes are ascertained according to the stake certificates of the stake accounts. Then, the block-producing node is ascertained from the stake accounts according to the stakes and the set delegated proof of stake consensus algorithm. For example, the stake accounts may be sorted according to the stake proportions, and then the nodes of the stake accounts are controlled sequentially as the block-producing node according to the order of the sorting result.

According to the technical solution of this embodiment, the stake certificate is issued in the block chain based on the set stake certificate issuing mechanism, and allocated to the stake account according to the stake proportion, and the operation data of issuing and allocating the stake certificate is stored into the block chain, the stake account referring to the block chain account. The circulation resource is issued in the block chain based on the set circulation resource issuing mechanism, and allocated to the block chain account according to the circulation resource allocation strategy, and the operations of issuing and allocating the circulation resource are stored into the block chain. Then, during the operation of the block chain, by using the stake certificate of each stake account as the consensus certificate, the block-producing node is ascertained according to the delegated proof of stake consensus algorithm. In an embodiment of the present disclosure, two sets of independent issuing mechanisms (the stake certificate issuing mechanism and the circulation resource issuing mechanism) are set in the block chain, the block-producing node is ascertained based on the stake certificate, and the circulation resource is used as the resource consumption in the block chain, thereby solving the contradiction between the existing DPOS consensus mechanism and the circulation mechanism of the digital currency. Thus, the stake resource characteristics and the circulation resource characteristics required by the block chain consensus may be taken into account, which makes the consensus result of the DPOS consensus mechanism stable and controllable.

In some embodiments, before the issuing a stake certificate in a block chain based on a set stake certificate issuing mechanism, the method may further include: changing a consensus certificate of the delegated proof of stake consensus algorithm deployed in the block chain from a circulation resource to a stake certificate.

The existing block chain system, for example, a commercial distributed design block chain operating system (Enterprise Operation System (EOS)) and Ethereum may be upgraded. That is, an existing digital currency is defined as a circulation resource in the block chain system. Stake certificates are newly added for issuance and allocation, and a new delegated proof of stake consensus algorithm is deployed. If the consensus certificate on which the delegated proof of stake consensus algorithm is dependent is a stake certificate, the block chain system may subsequently take account of the stake resource characteristics and the circulation resource characteristics required by the block chain consensus.

By modifying the consensus certificate of the deployed delegated proof of stake consensus algorithm in the block chain system, the stake certificate may be used as the consensus certificate to ascertain the block-producing node, which is also applicable to the existing block chain system, thus improving the application range.

Figure 2:
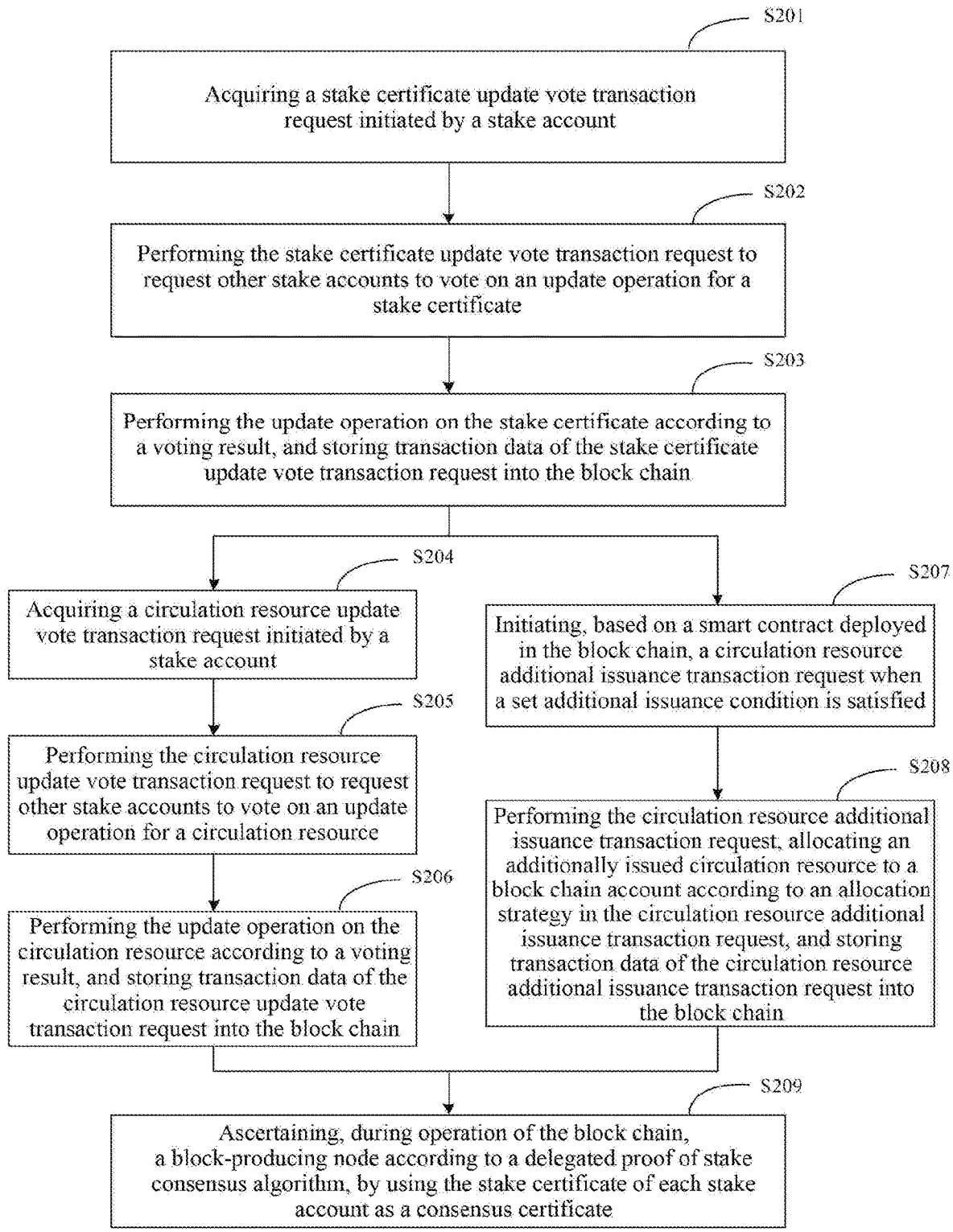
FIG. 2 is a flowchart of another method for processing a resource of a block chain according to an embodiment of the present disclosure.

FIG. 2 is a flowchart of another method for processing a resource of a block chain according to an embodiment of the present disclosure. On the basis of the above embodiment, this embodiment further explains the issuing mechanism of the stake certificate, the explanation specifically including S201-S203, and further explains the issuing mechanism of the circulation resource, the explanation specifically including S204-S206 or S207-S208. As shown in FIG. 2, the method specifically includes following steps.

S201, acquiring a stake certificate update vote transaction request initiated by a stake account.

Here, the stake account may be any block chain account holding a stake certificate.

In the specific embodiment of the present disclosure, after the initial issuance and the allocation for the stake certificate in the block chain are completed, when an allocation proportion of the initial stake certificate needs to be changed, any initial stake account may initiate the stake certificate update vote transaction request to the block chain system. The stake certificate update vote request may include specific information of a stock certificate update operation, for example, account information of a new stake account.

S202, performing the stake certificate update vote transaction request to request other stake accounts to vote on an update operation for a stake certificate.

In this embodiment, after acquiring the stake certificate update vote transaction request, the block chain system may initiate a stake certificate update vote transaction according to the stake certificate update vote transaction request, and transmit the vote transaction in the block chain system, such that the other stake accounts except the stake account initiating the request votes on the update operation for the stake certificate associated with the vote transaction after receiving the stake certificate update vote transaction.

S203, performing the update operation on the stake certificate according to a voting result, and storing transaction data of the stake certificate update vote transaction request into the block chain.

Here, the update operation may include an operation of additionally issuing a stake certificate, an operation pf transferring a stake certificate to a new stake account, or an operation of deleting a stake certificate. The new stake account is a stake account newly added in the block chain.

Specifically, the block chain system ascertains the voting result. If a set proportion of stake accounts vote for the update operation, the corresponding update operation is performed on the stake certificate, and the transaction data of the stake certificate update vote transaction request is recorded in the block chain for subsequent tracing. Here, the set proportion reflects a ratio of a number of stake accounts approving the stake certificate update request to a number of all stake accounts voting on the request. Specifically, the set proportion may be set by the block chain system according to actual situations. For example, the set proportion may be 100%. It may be appreciated that a higher set proportion indicates that there are more stake accounts approving this stake certificate update request.

For example, the stake account A initiates a vote transaction request to newly add a stake account B, and a specific update operation is written in the request. If the request is voted through, the stake account B may be used as a new stake account in the block chain. Here, the stake certificate of the stake account B may be obtained by transferring a stake certificate from any existing stake account such as the stake account A, or may be obtained by additionally issuing a stake certificate. After the stake certificate is additionally issued, the stake certificates held by the stake accounts are adapted to their stake proportions.

In this embodiment, the allocation proportions of the stake certificates may be updated in different ways based on the voting of the stake accounts, such that the stake certificates may be flexibly adjusted on the basis of maintaining quantitative stability.

In the specific embodiment of the present disclosure, after the circulation resource is initially issued and allocated in the block chain, the additional issuance of the circulation resource may be implemented through S204-S206 or S207-S208. Specifically, the stake accounts may vote for the update on the circulation resource according to actual situations. Alternatively, through a pre-deployed smart contract in the block chain, the circulation resource may be updated when an additional issuance condition is satisfied, such that the circulation resource may be additionally issued in different ways, thereby avoiding inflation caused by the additional issuance of digital currencies in the existing technology.

S204, acquiring a circulation resource update vote transaction request initiated by a stake account.

In this embodiment, the update on the circulation resource may be decided through the voting of the stake accounts. When the circulation resource needs to be updated, any initial stake account may initiate the circulation resource update vote transaction request to the block chain system. The circulation resource update vote transaction request may include specific information of a circulation resource update operation, for example, a number of additionally issued circulation resources, and specific time at which the circulation resources are additionally issued.

S205, performing the circulation resource update vote transaction request to request other stake accounts to vote on an update operation for a circulation resource.

In this embodiment, after acquiring the circulation resource update vote transaction request, the block chain system may initiate a circulation resource update vote transaction according to the circulation resource update vote transaction request, and transmit the vote transaction in the block chain system, such that the other stake accounts except the stake account initiating the request votes on the update operation for the circulation resource associated with the vote transaction after receiving the circulation resource update vote transaction.

S206, performing the update operation on the circulation resource according to a voting result, and storing transaction data of the circulation resource update vote transaction request into the block chain.

Here, the update operation may include additional issuance and an allocation strategy of the circulation resource. The allocation strategy is to allocate additionally issued circulation resources to the stake accounts evenly or according to the stake proportions, or allocate the additionally issued circulation resource to a non-stake account.

Specifically, the block chain system ascertains the voting result. If a set proportion of stake accounts vote for the update operation, the corresponding update operation is performed on the circulation resource, and the transaction data of the circulation resource update vote transaction request is recorded in the block chain for subsequent tracing. Here, the set proportion may be set by the block chain system according to actual situations. For example, the set proportion may be 100%.

After S206, S209 may be performed.

S207, initiating, based on a smart contract deployed in the block chain, a circulation resource additional issuance transaction request when a set additional issuance condition is satisfied.

The smart contract may be pre-deployed in the block chain system. When there is a to-be-processed transaction, the block chain system may perform a corresponding transaction according to a different smart contract, and then, can process a different transaction, thus realizing the corresponding function. For example, a transfer is performed through a smart contract having a transfer function.

The set additional issuance condition includes: a total number of the block chain accounts reaching a set number, a block height reaching a set threshold value, or a circulation rate of the circulation resource meeting a set condition. Here, the block height refers to the number of blocks on the main chain of the block chain, and the set number, the set threshold value and the set condition are not limited in this embodiment, and may be set according to actual situations. For example, if the set number is 100,000, then the set additional issuance condition may be that the total number of the block chain accounts reaches 100,000.

Specifically, the set additional issuance condition corresponding to the smart contract may be ascertained to acquire data corresponding to a current additional issuance condition, so as to determine whether the data satisfies the current additional issuance condition. If the data satisfies the current additional issuance condition, then the circulation resource additional issuance transaction request is initiated. For example, when the additional issuance condition corresponding to the smart contract is that the total number of the block chain accounts reaches 100,000, then the total number of the block chain accounts is acquired to determine whether the total number of the block chain accounts reaches 100, 000. If the total number reaches 100,000, then the additional issuance condition is satisfied; otherwise, the additional issuance condition is not satisfied.

S208, performing the circulation resource additional issuance transaction request, allocating an additionally issued circulation resource to a block chain account according to an allocation strategy in the circulation resource additional issuance transaction request, and storing transaction data of the circulation resource additional issuance transaction request into the block chain.

The allocation strategy in the circulation resource additional issuance transaction request may be to allocate the additionally issued circulation resources to the stake accounts evenly or according to a set allocation proportion. The set allocation proportion may be set according to actual situations, and is not limited in this embodiment.

In this embodiment, after acquiring the circulation resource additional issuance transaction request, the block chain system may allocate the additionally issued circulation resource to the block chain accounts according to the allocation strategy therein. Specifically, the additionally issued circulation resource may be allocated to the stake account only according to the stake proportion, or may be allocated without distinguishing between stake accounts and non-stake accounts. The transaction data of the circulation resource additional issuance transaction request is stored into the block chain for subsequent tracing.

After S208, S209 may be performed.

S209, ascertaining, during operation of the block chain, a block-producing node according to a delegated proof of stake consensus algorithm, by using the stake certificate of each stake account as a consensus certificate.

Specifically, after the stake certificate and the circulation resource are updated, during the operation of the block chain, the stake may be re-ascertained according to the stake certificate of the each stake account, and then, the block-producing node is ascertained from these stake accounts according to the stake and the set delegated proof of stake consensus algorithm.

According to the technical solution of this embodiment, after the stake certificate is initially issued and allocated in the block chain, the allocation proportion of the stake certificate may be updated in different ways based on the voting of the stake accounts. After the circulation resource is initially issued and allocated in the block chain, the stake accounts may vote for the update on the circulation resource according to actual situations. Alternatively, through the pre-deployed smart contract in the block chain, the circulation resource may be updated when the additional issuance condition is satisfied. During the operation of the block chain, by using the stake certificate of the each stake account as the consensus certificate, the block-producing node is ascertained according to the delegated proof of stake consensus algorithm. In an embodiment of the present disclosure, two sets of independent issuing mechanisms (the stake certificate issuing mechanism and the circulation resource issuing mechanism) are set in the block chain, the block-producing node is ascertained based on the stake certificate, and the circulation resource is used as the resource consumption in the block chain, thereby solving the contradiction between the existing DPOS consensus mechanism and the circulation mechanism of the digital currency. Thus, the stake resource characteristics and the circulation resource characteristics required by the block chain consensus may be taken into account, which makes the consensus result of the DPOS consensus mechanism stable and controllable. In addition, the stake proportions of the stake accounts may be flexibly adjusted on the basis of maintaining quantitative stability of the stake certificates. The additional issuance of the circulation resource may be implemented according to actual situations, thereby avoiding the inflation caused by the additional issuance of the digital currencies in the existing technology.

Figure 3:
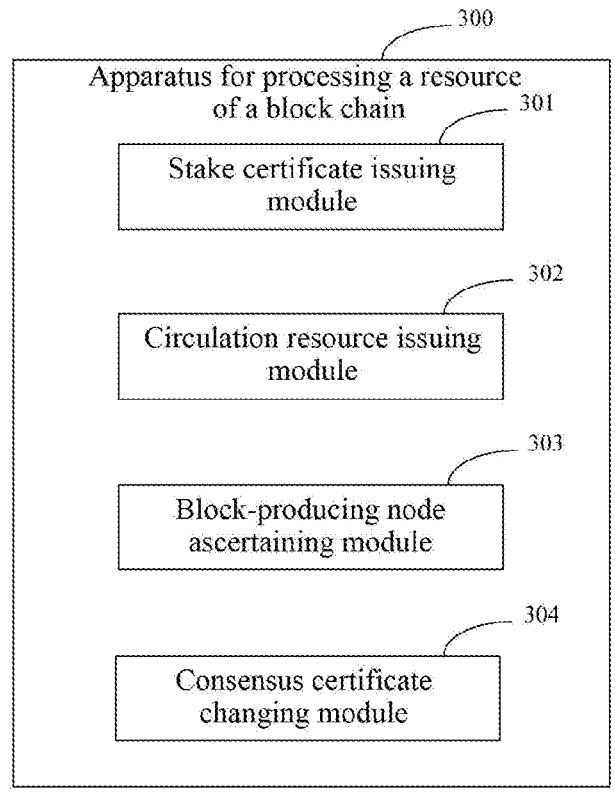
FIG. 3 is a schematic structural diagram of an apparatus for processing a resource of a block chain according to an embodiment of the present disclosure.

FIG. 3 is a schematic structural diagram of an apparatus for processing a resource of a block chain according to an embodiment of the present disclosure. This embodiment may be applicable to a situation where processing is performed on a resource in a block chain. The apparatus may implement the method for processing a resource of a block chain according to any embodiment of the present disclosure. The apparatus 300 may specifically include: a stake certificate issuing module 301, configured to issue a stake certificate in a block chain based on a set stake certificate issuing mechanism, allocate the stake certificate to a stake account according to a stake proportion, and store operation data of the issuing and allocating the stake certificate into the block chain, the stake account referring to a block chain account; a circulation resource issuing module 302, configured to issue a circulation resource in the block chain based on a set circulation resource issuing mechanism, allocate the circulation resource to the block chain account according to a circulation resource allocation strategy, and store the operations of the issuing and allocating the circulation resource into the block chain; and a block-producing node ascertaining module 303, configured to ascertain, during operation of the block chain, a block-producing node according to a delegated proof of stake consensus algorithm, by using the stake certificate of each stake account as a consensus certificate.

Alternatively, the stake certificate issuing module 301 is specifically configured to: ascertain, when a creation for the block chain is initiated, a total number of initially issued stake certificates, and allocate the stake certificates according to the stake proportion of each stake account; and store the total number of the stake certificates and the stake certificate allocated to the each stake account to a genesis block of the block chain.

Alternatively, the stake certificate issuing module 301 is specifically configured to: acquire a stake certificate update vote transaction request initiated by a stake account; perform the stake certificate update vote transaction request to request other stake accounts to vote on an update operation for a stake certificate; and perform the update operation on the stake certificate according to a voting result, and store transaction data of the stake certificate update vote transaction request into the block chain.

Here, the update operation includes an operation of additionally issuing a stake certificate, an operation pf transferring a stake certificate to a new stake account, and an operation of deleting a stake certificate.

Alternatively, the circulation resource issuing module 302 is specifically configured to: acquire a circulation resource update vote transaction request initiated by a stake account; perform the circulation resource update vote transaction request to request other stake accounts to vote on an update operation for a circulation resource; and perform the update operation on the circulation resource according to a voting result, and store transaction data of the circulation resource update vote transaction request into the block chain.

Here, the update operation includes additional issuance and an allocation strategy of the circulation resource.

Alternatively, the allocation strategy is to allocate additionally issued circulation resources to stake accounts evenly or according to stake proportions.

Alternatively, the circulation resource issuing module 302 is specifically configured to: initiate, based on a smart contract deployed in the block chain, a circulation resource additional issuance transaction request when a set additional issuance condition is satisfied; and perform the circulation resource additional issuance transaction request, allocate an additionally issued circulation resource to the block chain account according to an allocation strategy in the circulation resource additional issuance transaction request, and store transaction data of the circulation resource additional issuance transaction request into the block chain.

Alternatively, the set additional issuance condition includes: a total number of block chain accounts reaching a set number, a block height reaching a set threshold value, or a circulation rate of the circulation resource meeting a set condition.

Alternatively, the apparatus further includes a consensus certificate changing module 304, configured to: change, before the stake certificate is issued in the block chain based on the set stake certificate issuing mechanism, the consensus certificate of the delegated proof of stake consensus algorithm deployed in the block chain from the circulation resource to the stake certificate.

According to the technical solution of this embodiment, the issuance of the stake certificate and the circulation resource in the block chain is implemented through the cooperation between various functional modules. Then, during the operation of the block chain, by using the stake certificate of the each stake account as the consensus certificate, the block-producing node is ascertained according to the delegated proof of stake consensus algorithm. In an embodiment of the present disclosure, two sets of independent issuing mechanisms (the stake certificate issuing mechanism and the circulation resource issuing mechanism) are set in the block chain, the block-producing node is ascertained based on the stake certificate, and the circulation resource is used as the resource consumption in the block chain, thereby solving the contradiction between the existing DPOS consensus mechanism and the circulation mechanism of the digital currency. Thus, the stake resource characteristics and the circulation resource characteristics required by the block chain consensus may be taken into account, which makes the consensus result of the DPOS consensus mechanism stable and controllable.

According to embodiments of the present disclosure, the present disclosure further provides an electronic device and a readable storage medium.

Figure 4:
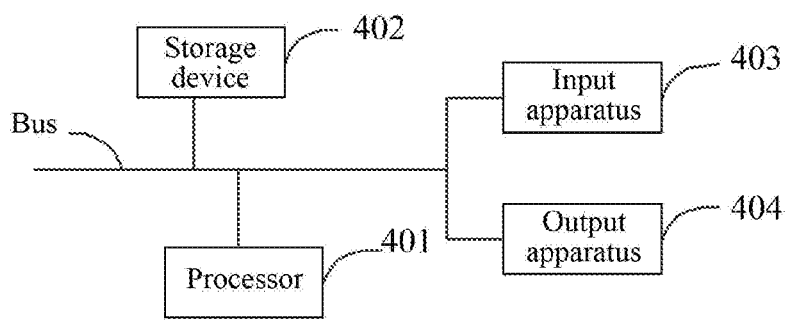
FIG. 4 is a block diagram of an electronic device used to implement embodiments of the present disclosure.

As shown in FIG. 4, FIG. 4 is a block diagram of an electronic device performing a method for processing a resource of a block chain according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 4, the electronic device includes one or more processors 401, a storage device 402, and an interface for connecting the components, the interface including a high speed interface and a low speed interface. The components are interconnected using different buses, and may be mounted on a common motherboard or in other ways as needed. The processors may process an instruction executed within the electronic device, the instruction including an instruction stored in the storage device or on the storage device to display graphical information of a GUI on an external input/output apparatus such as a display device coupled to the interface. In other implementations, a plurality of processors and/or a plurality of buses may be used, if desired, along with a plurality of storage devices. Also, a plurality of electronic devices may be connected, and each device provides a portion of necessary operations (e.g., as a server array, a group of blade servers or a multi-processor system). In FIG. 4, one processor 401 is taken as an example.

The storage device 402 is a non-transitory computer readable storage medium according to some embodiments of the present disclosure. Here, the storage device stores an instruction executable by at least one processor, to cause the at least one processor to perform the method for processing a resource of a block chain according to some embodiments of the present disclosure. The non-transitory computer readable storage medium in some embodiments of the present disclosure stores a computer instruction, the computer instruction being used to cause a computer to perform the method for processing a resource of a block chain according to some embodiments of the present disclosure.

As the non-transitory computer readable storage medium, the storage device 402 may be used to store a non-transitory software program, a non-transitory computer executable program and a module such as a program instruction/module (e.g., the stake certificate issuing module 301, the circulation resource issuing module 302, the block-producing node ascertaining module 303 and the consensus certificate changing module 304) corresponding to the method for processing a resource of a block chain in embodiments of the present disclosure. The processor 401 executes various functional applications and data processing of the server by running the non-transitory software program, the instruction and the module stored in the storage device 402, i.e., implements the method for processing a resource of a block chain in embodiments of the method.

The storage device 402 may include a storage program area and a storage data area. Here, the storage program area may store an operating system and an application program required for at least one function. The storage data area may store data, etc. created according to the use of the electronic device of the method for processing a resource of a block chain. In addition, the storage device 402 may include a high speed random access memory, and may also include a non-transitory storage device, for example, at least one magnetic disk storage device, a flash storage device, or other non-transitory solid state storage devices. In some embodiments, the storage device 402 may alternatively include a storage device disposed remotely relative to the processor 401. The remote storage device may be connected to the electronic device of the method for processing a resource of a block chain via a network. Examples of such network include, but not limited to, the Internet, an enterprise intranet, a local area network, a mobile communication network, and a combination thereof.

The electronic device performing the method for processing a resource of a block chain may further include: an input apparatus 403 and an output apparatus 404. The processor 401, the storage device 402, the input apparatus 403 and the output apparatus 404 may be connected via a bus or in other ways. In FIG. 4, the connection via a bus is taken as an example.

The input apparatus 403 may receive an inputted number or inputted character information, and generate a key signal input related to the user setting and functional control of the electronic device of the method for processing a resource of a block chain. For example, the input apparatus is a touch screen, a keypad, a mouse, a track pad, a touch pad, a pointing stick, one or more mouse buttons, a track ball, a joystick, or the like. The output apparatus 404 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computer and having a client-server relationship to each other.

According to the technical solution in an embodiment of the present disclosure, two sets of independent issuing mechanisms (a stake certificate issuing mechanism and a circulation resource issuing mechanism) are set in a block chain, a block-producing node is ascertained based on the stake certificate, and the circulation resources is used as resource consumption in the block chain, thereby solving the contradiction between the existing DPOS consensus mechanism and the circulation mechanism of the digital currency. Thus, the stake resource characteristics and the circulation resource characteristics required by a block chain consensus may be taken into account, which makes the consensus result of the DPOS consensus mechanism stable and controllable.

In addition, after the stake certificate is initially issued, the allocation information of the stake certificate is stored into the block chain, which is beneficial for subsequent tracing.

In addition, the allocation proportion of the stake certificate may be updated in different ways based on the voting of the stake accounts, such that the stake certificate may be flexibly adjusted on the basis of maintaining quantitative stability.

In addition, the stake accounts may vote for the update on the circulation resource according to actual situations, such that circulation resource may be additionally issued in different ways, thereby avoiding inflation caused by the additional issuance of digital currencies in the existing technology.

In addition, through a pre-deployed smart contract in the block chain, the additional issuance of the circulation resource may be implemented when an additional issuance condition is satisfied, thereby avoiding the inflation caused by the additional issuance of the digital currencies in the existing technology.

In addition, by modifying the consensus certificate of a deployed delegated proof of stake consensus algorithm in the block chain system, a stake certificate may be used as a consensus certificate to ascertain a block-producing node, which is also applicable to the existing block chain system, thus improving the application range.

It should be understood that the various forms of processes shown above may be used to resort, add or delete steps. For example, the steps described in some embodiments of the present disclosure may be performed in parallel, sequentially, or in a different order. As long as the desired result of the technical solution disclosed in some embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for processing a resource of a block chain, comprising:

issuing a stake certificate in a block chain based on a set stake certificate issuing mechanism, allocating the stake certificate to a stake account according to a stake proportion, and storing operation data of the issuing and allocating the stake certificate into the block chain, the stake account referring to a block chain account of a computer node of the block chain, wherein the issuing a stake certificate in a block chain based on a set stake certificate issuing mechanism, allocating the stake certificate to a stake account according to a stake proportion, and storing operation data of the issuing and allocating the stake certificate into the block chain comprises:

ascertaining, when a creation for the block chain is initiated, a total number of initially issued stake certificates, and allocating the stake certificates according to the stake proportion of each stake account, and storing the total number of the stake certificates and the stake certificate allocated to the each stake account to a genesis block of the block chain, wherein the total number of the stake certificates is constant, and the stake certificates are not used in resource circulation and are not associated with the circulation resource changeable in the resource circulation;

issuing the circulation resource in the block chain based on a set circulation resource issuing mechanism, allocating the circulation resource to the block chain account according to a circulation resource allocation strategy, and storing operations of the issuing and allocating the circulation resource into the block chain;

ascertaining, during operation of the block chain, a block-producing node according to a delegated proof of stake consensus algorithm, by using the stake certificate of each stake account as a consensus certificate;

sorting the state accounts according to the state proportion; and controlling computer nodes of the state accounts sequentially as the block-producing node according to an order of a sorting result.

2. The method according to claim 1, wherein the issuing a stake certificate in a block chain based on a set stake certificate issuing mechanism, allocating the stake certificate to a stake account according to a stake proportion, and storing operation data of the issuing and allocating the stake certificate into the block chain comprises:

acquiring a stake certificate update vote transaction request initiated by a stake account;

performing the stake certificate update vote transaction request to request other stake accounts to vote on an update operation for a stake certificate; and performing the update operation on the stake certificate according to a voting result, and storing transaction data of the stake certificate update vote transaction request into the block chain, wherein the update operation comprises an operation of additionally issuing a stake certificate, an operation pf transferring a stake certificate to a new stake account, or an operation of deleting a stake certificate.

3. The method according to claim 1, wherein the issuing a circulation resource in the block chain based on a set circulation resource issuing mechanism, allocating the circulation resource to the block chain account according to a circulation resource allocation strategy, and storing operations of the issuing and allocating the circulation resource into the block chain comprises:

acquiring a circulation resource update vote transaction request initiated by a stake account;

performing the circulation resource update vote transaction request to request other stake accounts to vote on an update operation for a circulation resource; and performing the update operation on the circulation resource according to a voting result, and storing transaction data of the circulation resource update vote transaction request into the block chain, wherein the update operation comprises additional issuance and an allocation strategy of the circulation resource.

4. The method according to claim 3, wherein the allocation strategy is to allocate additionally issued circulation resources to stake accounts evenly or according to stake proportions.

5. The method according to claim 1, wherein the issuing a circulation resource in the block chain based on a set circulation resource issuing mechanism, allocating the circulation resource to the block chain account according to a circulation resource allocation strategy, and storing operations of the issuing and allocating the circulation resource into the block chain comprises:

initiating, based on a smart contract deployed in the block chain, a circulation resource additional issuance transaction request when a set additional issuance condition is satisfied; and performing the circulation resource additional issuance transaction request, allocating an additionally issued circulation resource to the block chain account according to an allocation strategy in the circulation resource additional issuance transaction request, and storing transaction data of the circulation resource additional issuance transaction request into the block chain.

6. The method according to claim 5, wherein the set additional issuance condition comprises: a total number of block chain accounts reaching a set number, a block height reaching a set threshold value, or a circulation rate of the circulation resource meeting a set condition.

7. The method according to claim 1, wherein before the issuing a stake certificate in a block chain based on a set stake certificate issuing mechanism, the method further comprises:

changing the consensus certificate of the delegated proof of stake consensus algorithm deployed in the block chain from the circulation resource to the stake certificate.

8. An electronic device, comprising:

at least one processor; and a storage device, communicatively connected with the at least one processor, wherein the storage device stores instructions executable by the at least one processor, and the instructions, when executed by the at least one processor, cause the at least one processor to perform operations, the operations comprising, issuing a stake certificate in a block chain based on a set stake certificate issuing mechanism, allocating the stake certificate to a stake account according to a stake proportion, and storing operation data of the issuing and allocating the stake certificate into the block chain, the stake account referring to a block chain account of a computer node of the block chain, wherein the issuing a stake certificate in a block chain based on a set stake certificate issuing mechanism, allocating the stake certificate to a stake account according to a stake proportion, and storing operation data of the issuing and allocating the stake certificate into the block chain comprises:

ascertaining, when a creation for the block chain is initiated, a total number of initially issued stake certificates, and allocating the stake certificates according to the stake proportion of each stake account, and storing the total number of the stake certificates and the stake certificate allocated to the each stake account to a genesis block of the block chain, wherein the total number of the stake certificates is constant, and the stake certificates are not used in resource circulation and are not associated with the circulation resource changeable in the resource circulation;

issuing the circulation resource in the block chain based on a set circulation resource issuing mechanism, allocating the circulation resource to the block chain account according to a circulation resource allocation strategy, and storing operations of the issuing and allocating the circulation resource into the block chain;

ascertaining, during operation of the block chain, a block-producing node according to a delegated proof of stake consensus algorithm, by using the stake certificate of each stake account as a consensus certificate;

sorting the state accounts according to the state proportion; and controlling computer nodes of the state accounts sequentially as the block-producing node according to an order of a sorting result.

9. The electronic device according to claim 8, wherein the issuing a stake certificate in a block chain based on a set stake certificate issuing mechanism, allocating the stake certificate to a stake account according to a stake proportion, and storing operation data of the issuing and allocating the stake certificate into the block chain comprises:

acquiring a stake certificate update vote transaction request initiated by a stake account;

performing the stake certificate update vote transaction request to request other stake accounts to vote on an update operation for a stake certificate; and performing the update operation on the stake certificate according to a voting result, and storing transaction data of the stake certificate update vote transaction request into the block chain, wherein the update operation comprises an operation of additionally issuing a stake certificate, an operation pf transferring a stake certificate to a new stake account, or an operation of deleting a stake certificate.

10. The electronic device according to claim 8, wherein the issuing a circulation resource in the block chain based on a set circulation resource issuing mechanism, allocating the circulation resource to the block chain account according to a circulation resource allocation strategy, and storing operations of the issuing and allocating the circulation resource into the block chain comprises:

acquiring a circulation resource update vote transaction request initiated by a stake account;

performing the circulation resource update vote transaction request to request other stake accounts to vote on an update operation for a circulation resource; and performing the update operation on the circulation resource according to a voting result, and storing transaction data of the circulation resource update vote transaction request into the block chain, wherein the update operation comprises additional issuance and an allocation strategy of the circulation resource.

11. The electronic device according to claim 10, wherein the allocation strategy is to allocate additionally issued circulation resources to stake accounts evenly or according to stake proportions.

12. The electronic device according to claim 8, wherein the issuing a circulation resource in the block chain based on a set circulation resource issuing mechanism, allocating the circulation resource to the block chain account according to a circulation resource allocation strategy, and storing operations of the issuing and allocating the circulation resource into the block chain comprises:

initiating, based on a smart contract deployed in the block chain, a circulation resource additional issuance transaction request when a set additional issuance condition is satisfied; and performing the circulation resource additional issuance transaction request, allocating an additionally issued circulation resource to the block chain account according to an allocation strategy in the circulation resource additional issuance transaction request, and storing transaction data of the circulation resource additional issuance transaction request into the block chain.

13. The electronic device according to claim 12, wherein the set additional issuance condition comprises: a total number of block chain accounts reaching a set number, a block height reaching a set threshold value, or a circulation rate of the circulation resource meeting a set condition.

14. The electronic device according to claim 8, wherein before the issuing a stake certificate in a block chain based on a set stake certificate issuing mechanism, the method further comprises:

changing the consensus certificate of the delegated proof of stake consensus algorithm deployed in the block chain from the circulation resource to the stake certificate.

15. A non-transitory computer readable storage medium, storing computer instructions, wherein the computer instructions are used to cause a computer to perform operations, the operations comprising:

issuing a stake certificate in a block chain based on a set stake certificate issuing mechanism, allocating the stake certificate to a stake account according to a stake proportion, and storing operation data of the issuing and allocating the stake certificate into the block chain, the stake account referring to a block chain account of a computer node of the block chain, wherein the issuing a stake certificate in a block chain based on a set stake certificate issuing mechanism, allocating the stake certificate to a stake account according to a stake proportion, and storing operation data of the issuing and allocating the stake certificate into the block chain comprises:

ascertaining, when a creation for the block chain is initiated, a total number of initially issued stake certificates, and allocating the stake certificates according to the stake proportion of each stake account, and storing the total number of the stake certificates and the stake certificate allocated to the each stake account to a genesis block of the block chain, wherein the total number of the stake certificates is constant, and the stake certificates are not used in resource circulation and are not associated with the circulation resource changeable in the resource circulation;

issuing circulation resource in the block chain based on a set circulation resource issuing mechanism, allocating the circulation resource to the block chain account according to a circulation resource allocation strategy, and storing operations of the issuing and allocating the circulation resource into the block chain;

ascertaining, during operation of the block chain, a block-producing node according to a delegated proof of stake consensus algorithm, by using the stake certificate of each stake account as a consensus certificate;

sorting the state accounts according to the state proportion; and controlling computer nodes of the state accounts sequentially as the block-producing node according to an order of a sorting result.

\* \* \* \* \*